March 6, 1951
R. JACKSON
2,544,534
PNEUMATIC ELEVATOR AND CONVEYER
FOR PULVERULENT MATERIAL
Filed June 19, 1947
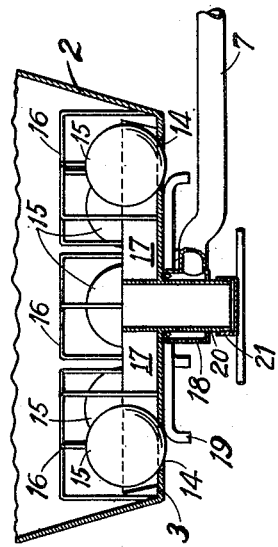
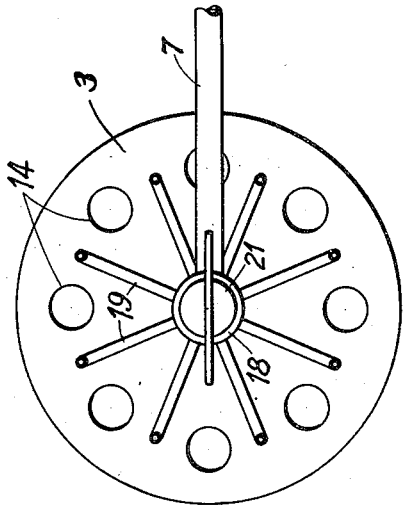
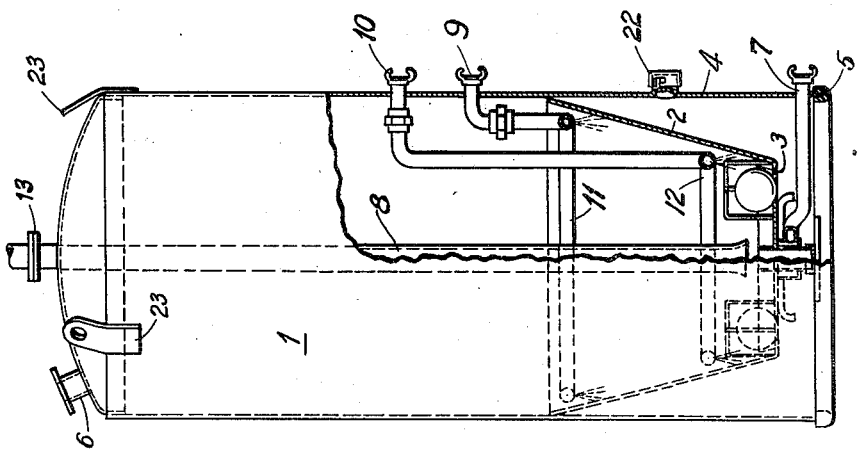
INVENTOR
*REGINALD JACKSON*
BY
Robert T. Teeter
ATTORNEY Patented Mar. 6, 1951

2,544,534

UNITED STATES PATENT OFFICE 2,544,534

PNEUMATIC ELEVATOR AND CONVEYER FOR PULVERULENT MATERIAL

Reginald Jackson, East St. Louis, Ill., assignor to Aluminum Company of America, Pittsburgh, Pa., a corporation of Pennsylvania Application June 19, 1947, Serial No. 755,766

4 Claims. (Cl. 302—53)

This invention relates to a pneumatic elevator and conveyor for pulverulent material, and more particularly to an apparatus suitable for elevation and discharge of bulk granular or powdered cargo from open holds of ships or barges. The apparatus is adapted to be handled by a boom or crane, and may be lowered onto the pulverulent material, lifted and occasionally moved for the handling of such material by that type of suspension mechanism.

Among other materials, the apparatus of the invention is suited to the handling of bulk alumina and may be used for unloading of such material from holds or hatches of an ordinary ship or barge.

The device known as the pressure blow case has been widely used for elevating and conveying fine granular material, through piping, by means of compressed air. Previously known blow cases were alternately filled by gravity, or other positive methods, and then discharged by admission of compressed air to the interior of the blow case. This invention has for one object the arrangement of a pressure blow case so that it may be alternately filled with pulverulent material by reducing the pressure within the blow case, and then discharged by increasing the pressure within the blow case.

The invention includes the provision of one or more check valves in or near the bottom of a blow case, for the admission of the pulverulent material, means for reducing the pressure in the blow case, and means for increasing the pressure therein. Further it is possible to employ auxiliary suction sweepers with the blow case of the invention for picking up pulverulent material in areas inaccessible to the main body of the blow case.

Other advantages of the invention will become apparent upon a reading of the following detailed description, with reference to the drawing, in which:

Fig. 1 is an elevation, partly in section, of a typical blow case in accordance with the invention;

Fig. 2 is an enlarged section of the valve deck and associated parts at lower end of the blow case shown in Fig. 1; and Fig. 3 is an enlarged bottom view of the valve deck and underlying parts shown in Fig. 1, to the same scale as the section shown in Fig. 2.

As shown in Fig. 1 the blow case I is a vertical cylindrical shell having a reduced inner portion or cone 2 at the lower end thereof which terminates in a horizontal valve deck 3. An open skirt-like extension 4, of the cylindrical portion of the shell, is adapted to form an auxiliary vacuum- or pressure-tight filling chamber around and below the cone 2 and valve deck 3 (for purposes to be mentioned later), when the extension 4 of the blow case I is set on a floor or other structure, with a sealing ring 5 therebetween.

The blow case I is adapted to be filled with pulverulent material when the pressure therein is reduced, a condition conveniently produced by evacuation thereof through a flanged fitting 6 provided in the upper end of the blow case I. Since it is usually desirable to provide for aerating the pulverulent material as it passes into the blow case I, an air line 7 (and associated parts to be described later) is provided, and it may be open to a source of compressed air, but other lines communicating with the blow case I should be valved off during filling. The pulverulent material is drawn into the blow case I under conditions of reduced pressure therein and, to enter the blow case I, passes through the valves in the valve deck 3 (also to be described later).

When pulverulent material has been accumulated in the blow case I, it may be discharged through a material delivery tube 8, installed in the interior of the blow case I and terminating therein just above the valve deck 3, by increasing the pressure in the blow case I. The increase in pressure may conveniently be produced by admitting compressed air through air lines 9 and 10 or through flanged fitting 6. It is especially desirable to admit compressed air through air lines 9 and 10 since they communicate through suitable piping, with an upper aeration ring 11 and a lower aeration ring 12, respectively. Both of these rings are preferably located within cone 2, around the delivery tube 8, and above the lower end of tube 8. The air, particularly that supplied to either or both aeration rings, tends to fluidize the material within the blow case, and increases the pressure within the blow case so as to close the check valves in the valve deck 3 and force fluidized pulverulent material through the delivery tube 8. At the upper end of the blow case I, the delivery tube 8 is provided with a suitable delivery fitting 13.

The blow case I may be supported from a number of ears 23 adapted to receive rope slings. Fexible hoses or other suitable conduit may be employed for the desired connections to the flanged fitting 6, the air lines 7, 9 and 10, and the delivery fitting 13. All of the above may be suitably handled by suspension from a boom or crane.

The specific arrangement of the aforementioned valve deck 3 and associated parts may now best be described with reference to Figs. 2 and 3. It will be seen that the valve deck 3 comprises a horizontal plate closing the end of the cone 2 and having a plurality of ports 14 suitably arranged therein. Any desired number of ports may be employed, and eight are shown in the drawing, the same being arranged in a symmetrical pattern at a common radius from the center of the valve deck 3. The check valve elements are rubber balls 15 adapted to seat on the ports 14. The balls 15 are confined within suitable wire cages 16 so that they may lift to permit flow of pulverulent material through the ports and seat themselves by gravity or pressure to prevent reverse flow of the pulverulent material. Each valve comprising a port 14 and a ball 15, with its cage 16, is separated from each other valve by a divider 17 as shown.

Below the valve deck 3 there is an aeration manifold 18 communicating through a suitable pipe or tube with the aforementioned air line 7. Extending radially from this manifold 18 are a plurality of aeration pipes 19, each having a nozzle turned downwardly from the valve deck 3 at a location intermediate two ports 14. By this arrangement of the aerating system, air can be admitted through air line 7, manifold 18, and the several aerating pipes 19, if found desirable, to fluidize the pulverulent material as it is drawn up through the ports 14.

Also extending downwardly through the valve deck 3 is a clean out fitting 20 having a suitable closure cap 21. This cap may be removed when it is desired to empty the blow case 1 of pulverulent material not removed by the ordinary pressure method of discharging the blow case.

One or more suction sweeper fittings 22 are conveniently provided in the skirt-like extension 4 to receive auxiliary suction sweeper hoses for reaching difficultly accessible areas. When such hoses are employed, the reduced pressure effected in blow case 1 is communicated to the suction sweepers to draw pulverulent material into blow case 1 as before described. In such cases, however, the aforementioned skirt-like extension 4 of the blow case 1 must be sealed against a floor or other structure to form an auxiliary vacuum-tight filling chamber. The sealing ring 5 may be employed, as shown, to effect a seal against a floor or an auxiliary bottom plate selected for that purpose. If desired, a removable closure structure containing the sealing ring 5, may alternatively be employed to close the end of the skirt-like extension.

It should be understood that, in the unloading of pulverulent material from a hatch or hold there will usually be some quantities thereof which cannot be elevated and conveyed by the ordinary method of using the blow case 1. However, the apparatus lends itself to the sweeping and clean-up of difficultly accessible areas, since a number of suction sweeper hoses may be connected through one or more suction sweeper fittings 22, and used to collect in the blow case such portions of the pulverulent material. The provision of connections 22 for the suction sweepers is desirable since it avoids the necessity of using separately actuated vacuum sweepers or conveyors on difficultly accessible material.

It will be seen that the invention adapts the pressure blow case 1 to the elevation and conveying of pulverulent material, without depending upon gravity methods for filling the blow case. It has been found that the blow case 1 may be filled to substantial depth by a partial vacuum. For example, bulk alumina may be drawn up into such a vessel to a depth of 1 foot, or more, per inch (mercury) of vacuum applied. In ordinary use the pulverulent material immediately under the blow case 1 tends to be drawn directly up into the blow case 1, which settles into the mass of material. The blow case 1 should be allowed to settle at a suitable rate, but some restraint should be applied to keep it from swinging or falling over. Likewise, the restraining means can be employed to lift, move and lower the blow case 1 so as to reach all accessible portions of the mass of pulverulent material.

What is claimed is:

1. A pneumatic elevator and conveyor for pulverulent material comprising a blow case having a check valve deck at the bottom thereof for admission of said material, a delivery tube installed in the interior of said blow case and terminating therein above said valve deck, for discharge of said material, said blow case being adapted for connection to means for reducing the pressure within said blow case by evacuation thereof for filling the same with said material and to means for increasing the pressure within said blow case for discharging the same of said material, and an aerating means below said valve deck adapted for connection to a source of compressed air during filling of said blow case.

2. A pneumatic elevator and conveyor for pulverulent material comprising a blow case having a check valve deck at the bottom thereof for admission of said material, said valve deck having a plurality of ports therethrough with caged balls associated therewith to form check valves, a delivery tube installed in the interior of said blow case and terminating therein above said valve deck, for discharge of said material, said blow case being adapted for connection to means for reducing the pressure within said blow case by evacuation thereof for filling the same with said material and to means for increasing the pressure within said blow case for discharging said blow case of said material, an aerating means below said valve deck adapted for connection to a source of compressed air during filling of said blow case, and at least one aerating means located within said blow case adjacent the lower end of said delivery tube and adapted for connection to a source of compressed air during discharging of said blow case.

3. A pneumatic elevator and conveyor for pulverulent material comprising a blow case having at least one check valve at the lower end thereof for admission of said material, a delivery tube installed in the interior of said blow case and terminating therein near said check valve, for discharge of said material, said blow case being adapted for connection to means for reducing the pressure within said blow case by evacuation thereof for filling the same with said material and to means for increasing the pressure within said blow case for discharging the same of said material, means for forming an auxiliary vacuum-tight filling chamber around and below said valve, and means for connecting at least one auxiliary suction sweeper to said filling chamber for admission of said material, through said filling chamber and said valve, when pressure is reduced in said blow case.

4. A pneumatic elevator and conveyor for pulverulent material comprising a blow case having a check valve deck at the bottom thereof for admission of said material, a delivery tube installed in the interior of said blow case and terminating therein above said valve deck, for discharge of said material, said blow case being adapted for connection to means for reducing the pressure within said blow case by evacuation thereof for filling the same with said material and to means for increasing the pressure within said blow case for discharging the same of said material, and an aerating manifold having downwardly directed nozzles below said valve deck adapted for connection to a source of compressed air during filling of said blow case.

REGINALD JACKSON.

REFERENCES CITED

The following references are of record in the file of this patent:

UNITED STATES PATENTS

| Number | Name | Date |
|---|---|---|
| 351,783 | Lewis | Nov. 2, 1886 |
| 2,171,402 | Muir | Aug. 29, 1939 |

FOREIGN PATENTS

| Number | Country | Date |
|---|---|---|
| 279,242 | Germany | Oct. 31, 1914 |
| 449,432 | Great Britain | June 26, 1936 |